(12) United States Patent
Maybee et al.

(10) Patent No.: US 8,156,476 B2
(45) Date of Patent: Apr. 10, 2012

(54) DEBUGGING SUPPORT FOR TASKS IN MULTITHREADED ENVIRONMENTS

(75) Inventors: Paul Maybee, Seattle, WA (US); Johan Marien, Sammamish, WA (US); Roger Wolff, Sammamish, WA (US); Feng Yuan, Bellevue, WA (US); Brian Crawford, Seattle, WA (US); John Cunningham, Kirkland, WA (US); Gregg Miskelly, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 974 days.

(21) Appl. No.: 12/136,067

(22) Filed: Jun. 10, 2008

(65) Prior Publication Data
US 2009/0307663 A1    Dec. 10, 2009

(51) Int. Cl.
*G06F 9/44* (2006.01)
(52) U.S. Cl. ........................................... 717/124
(58) Field of Classification Search .................. 717/124
See application file for complete search history.

(56) References Cited

U.S. PATENT DOCUMENTS

| 5,048,018 A | 9/1991 | Bernstein et al. |
| 5,799,142 A | 8/1998 | Toyoda |
| 5,805,892 A | 9/1998 | Nakajima |
| 5,889,988 A | 3/1999 | Held |
| 6,275,956 B1 | 8/2001 | On et al. |
| 6,988,264 B2 | 1/2006 | Sarma et al. |
| 2005/0022167 A1 | 1/2005 | Gryko et al. |
| 2007/0061627 A1 | 3/2007 | Takagi et al. |

FOREIGN PATENT DOCUMENTS

| WO | 9934290 A1 | 7/1999 |
| WO | 2008003930 A1 | 1/2008 |

OTHER PUBLICATIONS

Kranzlmuller, et al., "Using Different Levels of Abstraction for Parallel Program Debugging", Proceedings of the 1997 IASTED International Conference on Intelligent Information Systems (IIS '97), Date: Dec. 8-10, 1997, pp. 523-529, Publisher: IEEE Computer Society.
Samofalov, et al. "Processing and Debugging of Parallel Programs on the Level of Task Model", Proceedings of the 4th International Conference on Parallel Computing Technologies, Date: 1997, pp. 402-403, Springer-Verlag, London, UK.
Paul Maybee, "NeD: The Network Extensible Debugger", Summer '92 USENIX Proceedings, pp. 145-153, Jun. 1992.

*Primary Examiner* — Philip Wang
(74) *Attorney, Agent, or Firm* — Ogilvie Law Firm (57) ABSTRACT

A debugger enhancement provides a debug-task-provider interface whose implementation includes routines designed to support debugging of programs that contain tasks written for a specific programming model. Task creation hierarchies, individual task properties, resource dependencies, synchronization dependencies, and other information can be made accessible during debugging, through a model-independent interface. In a multithreaded environment, a mapping between tasks and threads is also available.

20 Claims, 6 Drawing Sheets

DEBUGGING SUPPORT FOR TASKS IN MULTITHREADED ENVIRONMENTS

BACKGROUND

A debugger is a computer program used to test and debug other programs, which are referred to as debuggee programs or simply as "debuggees". A debugger generally provides a software developer with some control over debuggee execution, such as pausing execution to examine the debuggee's variables and other internal state information, stepping through debuggee code line-by-line, and setting a breakpoint to stop debuggee execution when a specified condition occurs within the debuggee. Some debuggers also allow a developer to modify the debuggee's internal state during debugging by setting variables, instead of merely observing the internal state.

Most debuggers provide command line user interfaces, for enhanced portability and decreased computing resource requirements. However, some debuggers have compatible front-ends that interact with their command line user interface. For example, a front-end may integrate a debugger with an Integrated Development Environment. Likewise, a front-end may provide graphics or visualization capabilities to users. In effect, each front-end becomes part of the debugger's user interface, thereby enhancing the debugger's usefulness.

However, the capabilities of a debugger user interface are also limited by kind of the information the user interface receives from a debugger engine. A debugger's engine is the portion of the debugger that interacts directly with, and controls, the debuggee. A debuggee program typically has different levels of abstraction, ranging from low-level machine code, up through data structures and procedures, then even higher to a user interface level, and finally to an intended purpose at the highest level of abstraction. Accordingly, many choices are made in a debugger about what information the debugger engine will provide to the debugger user interface, and about how that information will be provided.

SUMMARY

In some embodiments, a debug-task-provider interface supports the debugging of a debuggee program that contains tasks implemented in a particular programming model. A debug-task-provider implementation is associated with the debug-task-provider interface. The programming model used in the debuggee program is unspecified in the debug-task-provider interface but is specific in the debug-task-provider implementation.

The debug-task-provider implementation may contain routines to enumerate tasks of the debuggee program, including tasks associated with a particular thread, and to identify a hierarchy containing the tasks, for example. The debug-task-provider implementation may also include programming-model-specific routines for reading and writing properties in task synchronization objects, in other runtime objects, and in individual tasks of the debuggee program. A mapping between tasks and threads in the debuggee program may also be displayed.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Debuggers typically support a model of debugging based on processes and threads defined by a kernel. Even if a developer never programs to the thread model, threads may well be the only model available for viewing the program state in the debugger. But in many applications, and especially in parallel programs, a developer may express work more abstractly as tasks or work-items, which are then assigned by the kernel to be executed on threads.

Some embodiments discussed herein provide mechanisms for exposing abstract properties of task based programming models in a debugger. Debugger user interfaces can be written using these abstraction mechanisms. A given debugger may host an implementation of the abstraction for each task-based programming model the debugger supports. Thus, a consistent and compact yet powerful set of debugging tools can be developed for analyzing and viewing application task models, with capabilities that are defined independently of the specific task model(s) used by a given application.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, and/or device(s) providing one or more processors controlled at least in part by instructions. The instructions may be in the form of software in memory and/or specialized circuitry. In particular, although it may occur that many embodiments run on server computers, other embodiments may run on other computing devices, and any one or more such devices may be part of a given embodiment.

A "multithreaded" computer system is a computer system which supports multiple execution threads. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "task" is a work item which can be assigned one or more threads.

A "logical processor" or "processor" is a single independent hardware thread. For example a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

A "kernel" is low-level code which supports execution of applications, and in particular which schedules threads, tasks, or both. Some examples of kernels include runtime systems, hypervisors, and operating systems.

A "programming model" or "model" is a set of program design guidelines, which can be expressed, for instance, in the form of assumptions embedded in a program, in a set of language constructs and library objects that are utilized (or avoided) by a program, in a data format used by a program for communicating with other software, and so on. A "task model" is a programming model that provides tasks as a construct for organizing work to be performed by a program. Many kinds of programming models exist, include for example models that lie within one or more of the following categories: coroutine programming models, multicore programming models, parallel programming models, game development programming models, custom hardware programming models, GUI programming models, presentation programming models, event-driven programming models, messaging framework programming models, wide area network programming models, web application programming models, rich internet application programming models, handheld device programming models, cell phone programming models, database programming models, managed execution environment programming models, native code programming models, script programming models.

Whenever reference is made to data or instructions, it is understood that these items configure a computer-readable memory, as opposed to simply existing on paper, in a programmer's mind, or as a transitory signal on a wire, for example.

Operating Environments

Figure 1:
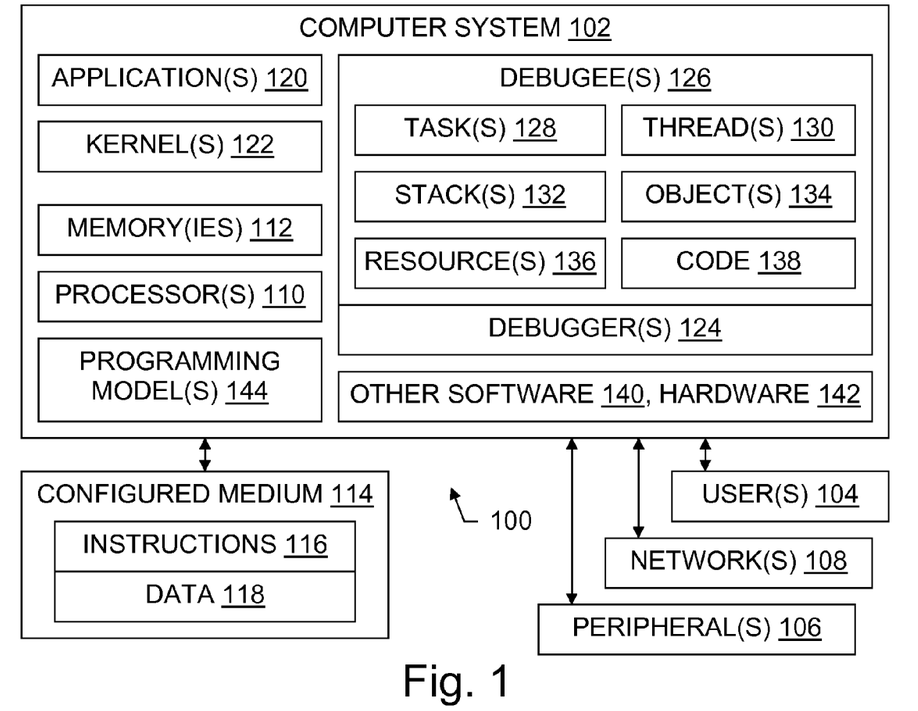
FIG. 1 is a block diagram illustrating a computer system in an operating environment, and configured storage medium embodiments.

With reference to FIG. 1, an operating environment 100 for an embodiment may include, for instance, a computer system 102, which may be multithreaded or not, and multiprocessor or not. An operating environment may include one or more computer systems, which may be clustered, client-server networked, and/or peer-to-peer networked. Some operating environments include a stand-alone (non-networked) computer system.

Human users 104 may interact with the computer system 102 or with another computer system in an embodiment by using screens, keyboards, and other peripherals 106. A software developer is understood to be a particular type of user 104; end-users are also considered users 104. Some examples of software developer users 104 include application program developers, debugger developers, and developers of libraries or other components that provide programming-model-specific code. Storage devices and/or networking devices may be considered peripheral equipment in some embodiments. Other computer systems (not shown) may interact with the computer system 102 or with another system embodiment using one or more connections to a network 108 via network interface equipment, for example.

The computer system 102 includes at least one logical processor 110. The computer system 102, like other suitable systems, also includes one or more memories 112. The memories 112 may be volatile, non-volatile, fixed in place, removable, magnetic, optical, and/or of other types. In particular, a configured medium 114 such as a CD, DVD, memory stick, or other removable non-volatile memory medium may become functionally part of the computer system 102 when inserted or otherwise installed, making its content accessible for use by processor 110. The removable configured medium 114 is an example of a memory 112.

Other examples of memory 112 include built-in RAM, ROM, hard disks, and other storage devices which are not readily removable by users 104.

The medium 114 is configured with instructions 116 that are executable by a processor 110. The medium 114 is also configured with data 118 which is created, modified, referenced, and/or otherwise used by execution of the instructions 116. The instructions 116 and the data 118 configure the memory 112/medium 114 in which they reside; when that memory is a functional part of a given computer system, the instructions 116 and data 118 also configure that computer system. For clarity of illustration, memories 112 are shown in a single block in FIG. 1, but it will be understood that memories may be of different physical types, and that applications 120 and other items shown in the Figures may reside partially or entirely within one or more memories 112, thereby configuring those memories.

In a given operating environment, the computer system 102 or another computer system may be configured with and/or run one or more software applications 120 which may contain components such as libraries, public interfaces, class instantiations, drivers, and interrupt handlers. One or more operating systems, hypervisors, or other kernels 122 will generally be present. A debugger 124 is provided to help a developer debug applications or other debuggee 126 software. In the illustrated configuration, the debuggee includes or otherwise influences various tasks 128, threads 130, call stacks 132, software objects 134, resources 136, and pieces of code 138. Other software 140 and hardware 142 other than that already enumerated may also be present. One or more programming models 144 are also present; at least one model 144 is embedded in the debuggee.

Some of the suitable operating environments for some embodiments include a Microsoft® Visual Studio® development environment (marks of Microsoft Corporation). Some suitable operating environments include Java® environments (mark of Sun Microsystems, Inc.), and some include environments which utilize languages such as C++ or C# ("C-Sharp"), but teachings herein are applicable with a wide variety of programming languages, programming models, and programs. In particular, although application program debugging is used as an example, embodiments may be useful in debugging other types of software as well, such as kernels 122 or libraries not yet included in applications 120.

Systems Generally

Figure 2:
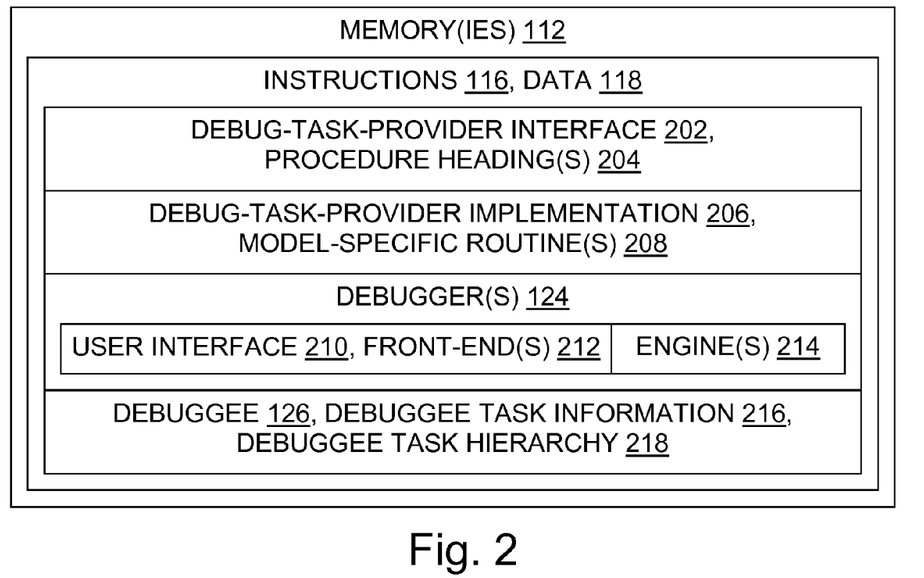
FIG. 2 is block diagram further illustrating a computer system memory configured with a debug-task-provider interface and a corresponding debug-task-provider implementation, as well as a debugger, a debuggee, and other items related to debugging.
Figure 3:
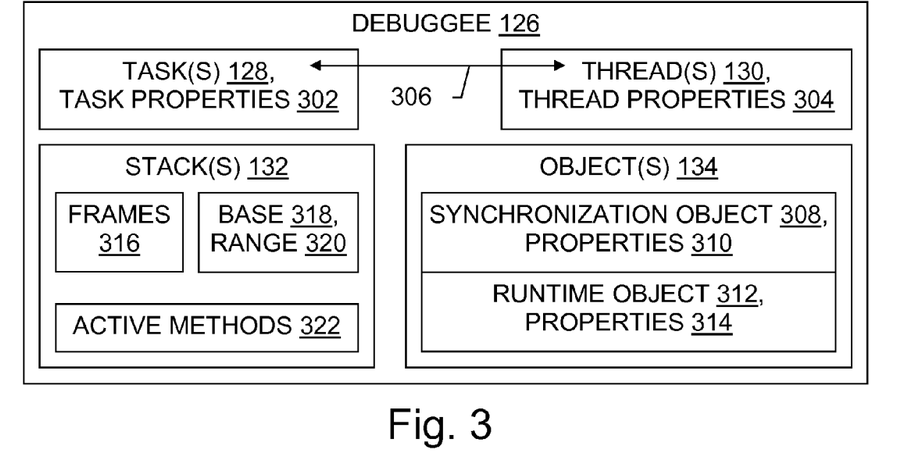
FIG. 3 is a block diagram further illustrating a debuggee and corresponding tasks, threads, objects, and call stacks.

Referring now to FIGS. 1 through 3, some embodiments provide a computer system 102 configured to assist debugging of a debuggee program which contains tasks that are implemented in a particular programming model. The system includes memory 112, and a logical processor 110 in operable communication with the memory. A debuggee 126 program configures the memory with debuggee instructions 116 and data 118. A debugger 124 and a debugger user interface 210 also configure the memory; the debugger 124 may be configured with a front-end 212, such as a graphical user interface front-end. A debugger engine 214 is in operable communication with the debugger user interface and with the debuggee program. The programming model for the debuggee is unspecified in the debugger engine. Unless otherwise indicated, debugging may be local and/or remote, e.g., the debuggee 126 is not necessarily on the same machine as the debugger user interface.

A debug-task-provider interface 202 includes one or more procedure headings 204. Procedure headings in general may be implemented as method signatures, type signatures, procedure specifications, method declarations, or the like. Procedure headings generally provide information such as the name of a function or other software routine, the parameters expected by the routine, and the value if any returned by the routine. In particular, a procedure heading 204 may provide such information for a routine that is designed to provide debugging support for tasks in multithreaded environments.

A debug-task-provider implementation 206 implements the debug-task-provider interface 202, and in particular provides routines 208 to implement procedure headings 204. The debug-task-provider implementation 206 is in operable communication with the debugger engine 214. The debug-task-provider implementation 206 includes debugger viewing (and possibly also manipulation) routines 208 that are specific to the programming model 144 for reading (and possibly writing) at least some task information 216 of the debuggee 126, such as a task hierarchy 218 or task properties.

As illustrated in FIG. 3, a debuggee may include tasks 128 which have certain specified task properties 302, and threads 130 which have certain specified thread properties 304. A mapping 306 assigns tasks to threads, or vice versa. Tasks 128 are application design constructs, defined by a developer to reflect aspects of the work the application should accomplish. By contrast, threads 130 are system execution constructs, defined by a kernel 122 to allocate work among processors 110 and/or among time slices on a given processor 110.

The debuggee 126 shown in FIG. 3 also contains or controls objects 134, including thread synchronization objects 308 which have specified properties 310, and runtime objects 312 which have specified properties 314. A thread synchronization object 308 may be created at runtime and hence be a particular kind of runtime object 312.

The illustrated debuggee 126 also influences one or more call stacks 132. For instance, invocations of debuggee 126 code may result in one or more frames being placed on a call stack. Each thread 130 may have its own call stack 132. Each call stack 132 exists in memory 112, and thus has a base 318 address and an address range 320. Routines which have been invoked and not yet returned are considered active methods 322 on a call stack.

In some embodiments, peripheral equipment such as human user I/O devices (screen, keyboard, mouse, microphone, speaker, motion sensor, etc.) will be present in operable communication with one or more processors 110 and memory 112. However, an embodiment may also be deeply embedded in a system, such that no human user 104 interacts directly with the embodiment.

In some embodiments, networking interface equipment provides access to networks 108, using components such as a packet-switched network interface card, a wireless transceiver, or a telephone network interface, for example, will be present in the computer system. However, an embodiment may also communicate through direct memory access, removable nonvolatile media, or other information storage-retrieval and/or transmission approaches, or an embodiment in a computer system may operate without communicating with other computer systems.

Not every item shown in the Figures need be present in every embodiment. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Visual Studio® Debugger Example

Examples given within this document do not describe all possible embodiments. Embodiments are not limited to the specific programs or scenarios provided herein. A given embodiment may include additional programs, different program languages, different program mechanisms, different data structures, and/or otherwise depart from the examples provided.

Bearing in mind the foregoing caveats, we now consider an example of support for debugging programs written with a task-based programming model for a multithreaded environment. The example includes a detailed debug-task-provider interface 202 designed for use in an extension of the Microsoft® Visual Studio® Debugger. Model-specific debugging support extends the Visual Studio® debugger engine 214 with a debug-task-provider implementation 206 matching the interface 202 discussed below.

Four task-related interfaces are provided for a Visual Studio® Debugger implementation: IDebugTaskProvider, IDebugRuntimeObject, IDebugTask, and IDebugSynchronizationObject. The IDebugTaskProvider represents one task programming model 144, and has methods for accessing the current task state of an application 120. The IDebugRuntimeObject is used as a base for the next two interfaces, and supports access to implementation specific properties 314 of runtime objects 312. The IDebugTask represents an individual task 128. Tasks may have children tasks, so a collection of tasks exposed by an IDebugTaskProvider generally includes a set of task tree structures, namely, a task hierarchy 218. The last interface, ISynchronizationObject, represents an arbitrary resource 136 used as an inter-task synchronization object 308.

Tasks have a set of basic properties 392, as defined in this example code in the TASKPROPERTIES construct below, namely, an ID, a state, a canceled flag, a name, and a location. An implementation 206 may provide model-specific property values as well, via IRuntimeObject::EnumProperties. An implementation does not necessarily have to provide values for all the basic properties. It also might not support an explicit task creation hierarchy, in which case all tasks are treated as root tasks.

A debug-task-provider implementation 206 would find and present the task structure of a particular debuggee task programming model 144. A given implementation 206 may examine the components of a debuggee application's state, for example, public and/or internal data structures, symbols, stacks, and thread local storage, in search of program artifacts that describe the programming model's task representation. The debug-task-provider implementation 206 then constructs a IDebugTask collection that mirrors the underlying application's task state.

The IDebugTaskProvider interface 202 may be implemented for any given programming model 144 that supports tasks. An embodiment could typically include at least one provider implementation 206 for a debuggee program's threading model, as threads can be viewed as a special case of tasks in which the mapping 306 between tasks and threads is always one-to-one. If additional task programming models are loaded into the debuggee program, then additional task provider interfaces 202 and implementations 206 could be loaded as well. A developer could then use the debugger user interface 210 to select the provider(s) to use while debugging the debuggee.

Figure 4:
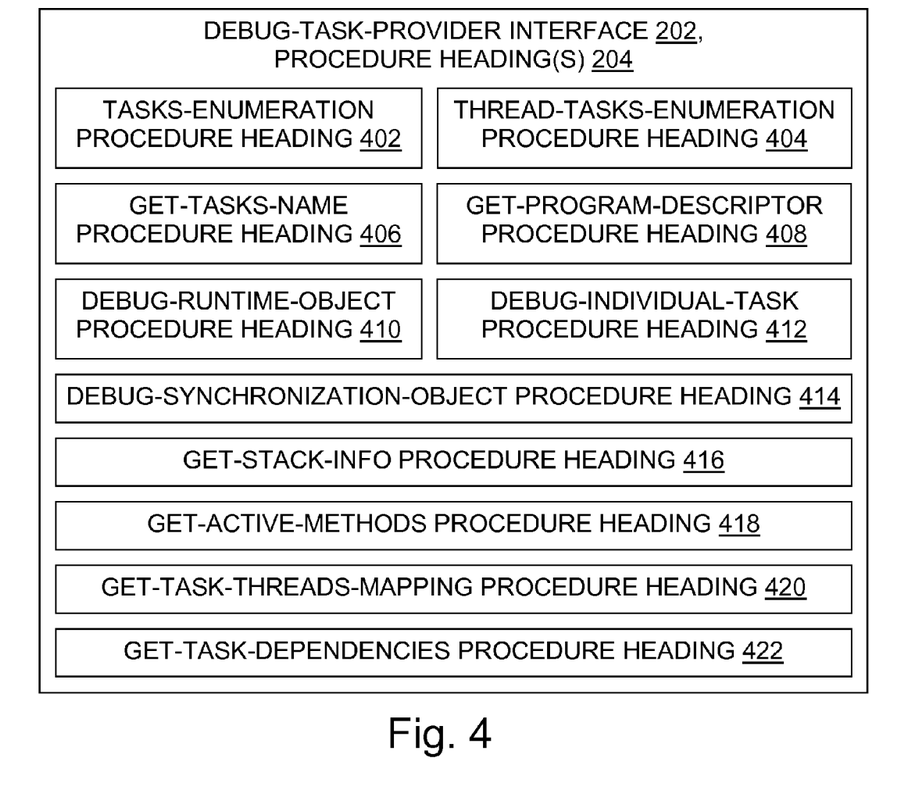
FIG. 4 is a block diagram further illustrating a debug-task-provider interface.

FIG. 4 illustrates some of the possible embodiments of a debug-task-provider interface 202, including some possible procedure headings 204. Other embodiments of a debug-task-provider interface 202 may include different or additional classes, interfaces, or procedure headings 204, or may include only a subset of the example items presented herein.

In one embodiment, the debug-task-provider interface 202 includes "interface IDebugTaskProvider: IUnknown", written in C++. In this embodiment, an IDebugTaskProvider helps implement access to an underlying runtime's task model, and in particular provides IDebugTaskProvider::EnumTasks( ), an example of a tasks-enumeration procedure heading 402:

HRESULT EnumTasks([in] BOOL fRoot, [out] IEnumDebugTasks** ppEnum);

EnumTasks( ) enumerates the root Tasks 128. Parameters include fRoot, which is True if only the root Tasks are desired, otherwise all Tasks will be returned in no defined order; and ppEnum, the IDebugTask enumerator. Return value S_OK indicates whether the EnumTasks( ) function succeeded.

Also provided is "IDebugTaskProvider::EnumThreadTasks( )", an example of a thread-tasks-enumeration procedure heading 404:

HRESULT EnumThreadTasks ([in] DWORD dwThreadId, [out] IEnumDebugTasks** ppEnum);

EnumThreadTasks( ) gets the Tasks associated with the thread with id dwThreadId. Parameters also include ppEnum, the enumerator. Return value S_OK indicates whether the EnumThreadTasks ( ) function succeeded. S_FALSE means the thread has no associated Tasks. The list is ordered from top of stack.

Also provided is "IDebugTaskProvider::GetName( )", an example of a get-tasks-name procedure heading 406:

HRESULT GetName ([out] BSTR*pbstrName);

GetName( ) gets the name for Tasks in this model, for example, "Task", "Chore", or "WorkItem". Parameter pbstrName is the name for Tasks. Return value S_OK indicates whether the GetName ( ) function succeeded.

Also provided is "IDebugTaskProvider::GetProgram( )", an example of a get-program-descriptor procedure heading 408:

HRESULT GetProgram([out] IDebugProgram2** ppProgram);

GetProgram( ) gets the program for this Task provider. Parameter ppProgram is the program or a descriptor of the program. Return value S_OK indicates whether the GetProgram ( ) function succeeded.

In one embodiment, the debug-task-provider interface 202 also includes "interface IDebugRuntimeObject: IUnknown", written in C++. In this embodiment, an IDebugRuntimeObject represents any implementation object, such as a runtime object 312, for which the debugger user 104 may need to see state information. In particular, DebugRuntimeObject::GetName( ) is provided, and is an example of a debug-runtime-object procedure heading 410:

HRESULT GetName ([out] BSTR*pbstrName);

GetName( ) gets the name of the object, in the form of a friendly, user-displayable name that describes the object. Parameter pbstrName is the name of the object. Return value S_OK indicates whether GetName( ) succeeded; GetName( ) returns an empty string if no name is available.

A property method DebugRuntimeObject::EnumProperties( ) is used to retrieve implementation specific information about a runtime object, and is another example of a debug-runtime-object procedure heading 410:

```
HRESULT EnumProperties(
[in] DBGPROP_INFO_FLAGS dwFieldSpec,
[in] UINT nRadix,
[out] ULONG* pcelt,
[out] IEnumDebugPropertyInfo** ppepi);
```

EnumProperties( ) directly enumerates a set of properties, such as runtime object properties 314, allowing all information to be retrieved with a single call. The set of properties available is runtime specific. For example, a runtime supporting structured parallelism could use the properties to expose parameter binding information for a Task. Parameters include dwFieldSpec, a set of flags that indicates what fields of the DebugPropertyInfo structure in the enumerator will be filled out, namely, a combination of the following flags: DBGPROP_INFO_NAME, DBGPROP_INFO_TYPE, DBGPROP_INFO_VALUE, DBGPROP_INFO_FULLNAME, DBGPROP_INFO_ATTRIBUTES, DBGPROP_INFO_DEBUGPROP. Parameters also include nRadix, the radix to be used in formatting any numerical information in the DebugPropertyInfo; pcelt, the number of elements in ppepi; and ppepi, the DebugPropertyInfo enumerator. Return value S_OK indicates whether EnumProperties( ) succeeded; S_FALSE means there are no DebugPropertyInfos to enumerate, in which case ppepi is set to NULL.

EnumProperties( ) is used to directly enumerate specific Task properties. Partameter dwFieldSpec controls what fields should be filled out in the resulting enumerator, as follows: DBGPROP_INFO_NAME is set to fill in m_bstrName; DBGPROP_INFO_TYPE is set to fill in m_bstrType; DBGPROP_INFO_VALUE is set to fill in m_bstrValue; DBGPROP_INFO_FULLNAME is set to fill in m_bstrFullName; DBGPROP_INFO_ATTRIBUTES is set to fill in m_dwAttrib; DBGPROP_INFO_DEBUGPROP is set to fill in m_pDebugProp.

In one embodiment, the debug-task-provider interface 202 also includes "interface IDebugTask: IDebugRuntimeObject", written in C++. In this embodiment, an IDebugTask represents schedulable work as defined by a particular runtime kernel 122 executing in a debuggee 126 program. Several examples of debug-individual-task procedure headings 412 are provided, beginning with IDebugTask::EnumFrameInfo( ):

```
HRESULT EnumFrameInfo(
[in] FRAMEINFO_FLAGS dwFieldSpec,
[in] UINT nRadix,
[out] IEnumDebugFrameInfo2** ppEnum);
```

EnumFrameInfo( ) enumerates the stack frames 316 for this task 128. EnumFrameInfo( ) provides an efficient way to enumerate each frame and its properties with one call. The context's current frame is always enumerated first, followed by each successive frame down to the context's oldest frame, which is enumerated last.

Parameters include dwFieldSpec, a set of flags that indicates what fields (and how) of the FRAMEINFO structure in the enumerator will be filled out, using a combination of the following flags. The first set of flags indicates which fields are requested to be filled out: FIF_FUNCNAME, FIF_RETURNTYPE, FIF_ARGS, FIF_LANGUAGE, FIF_MODULE, FIF_STACKRANGE, FIF_FRAME, FIF_DEBUGINFO. Use FIF_FUNCNAME_FORMAT to format the function name into a single string. Use FIF_ARGS_TYPES, FIF_ARGS_NAMES, FIF_ARGS_VALUES, and/or FIF_ARGS_NOFORMAT. Parameters also include nRadix, the radix to be used in formatting any numerical information in the FRAMEINFO; and ppEnum, the FRAMEINFO enumerator. Return value S_OK indicates whether EnumFrameInfo( ) succeeded.

EnumFrameInfo( ) is used to get available information about a number of stack frames with a single call. Parameter dwFieldSpec is used to control what fields should be filled out in the resulting FRAMEINFOs: FIF_FUNCNAME is set to fill in m_bstrFuncName; FIF_RETURNTYPE is set to fill in m_bstrReturnType; FIF_ARGS is set to fill in m_bstrArgs; FIF_LANGUAGE is set to fill in m_bstrLanguage; FIF_MODULE is set to fill in m_bstrModule; FIF_STACKRANGE is set to fill in m_dwMin and m_dwMax; FIF_FRAME is set to fill in m_pFrame; FIF_DEBUGINFO is set to fill in m_fHasDebugInfo. FIF_FUNCNAME_FORMAT is set to format m_bstrFuncName as a single string using all the flags specified above. For example: if FIF_RETURNTYPE|FIF_FUNCNAME|FIF_ARGS_TYPES|FIF_ARGS_NAMES|FIF_ARGS_VALUES are specified then m_bstrFuncName contains "int CFoo::foo(int x=1, int y=2)". FIF_FUNCNAME_LINES is set to append the line offset into the function to the end of m_bstrFuncName. FIF_FUNCNAME_OFFSET is set to append the byte offset into the function to the end of m_bstrFuncName. FIF_ARGS_TYPES is set to include the parameter types in m_bstrArgs. FIF_ARGS_NAMES is set to include the parameter names in m_bstrArgs. FIF_ARGS_VALUES is set to include the parameter values in m_bstrArgs. FIF_ARGS_NOFORMAT is set to not format m_bstrArgs; instead, m_bstrArgs contains a NULL-terminated series of NULL-terminated strings that represents the parameter information. For example: if FIF_ARGS_NAMES|FIF_ARGS_VALUES are specified, m_bstrArgs will contain "x<NULL>3<NULL>y<NULL>4<NULL><NULL>".

Another debug-individual-task procedure heading 412 provided is IDebugTask::GetTaskProvider( ):

```
HRESULT GetTaskProvider([out] IDebugTaskProvider** ppProvider);
```

GetTaskProvider( ) gets the associated provider, in parameter ppProvider, and returns S_OK on success.

Another debug-individual-task procedure heading 412 provided is IDebugTask::GetThread( ):

HRESULT GetThread ([out] IDebugThread2**ppThread);

GetThread( ) gets the thread 130 that this task 128 is executing on. Parameter ppThread is the thread this task is running on. Return value is S_OK if GetThread( ) succeeded and returned a non-null value, and S_FALSE if the task is not assigned to a thread, in which case null is returned for the thread.

Another debug-individual-task procedure heading 412 provided is IDebugTask:: GetParent( ):

HRESULT GetParent ([out] IDebugTask**ppParent);

GetParent( ) gets the parent Task for this Task, in parameter ppParent. On success, GetParent( ) returns S_OK and a non-null value for the parent; on failure GetParent( ) returns S_FALSE indicating no parent found, and null.

Another debug-individual-task procedure heading 412 provided is IDebugTask:: EnumTasks( ):

HRESULT EnumTasks ([out] IEnumDebugTasks**ppEnum);

EnumTasks( ) enumerates the children of this Task 128, in parameter ppEnum, the IDebugTask enumerator, and returns S_OK on success.

Another debug-individual-task procedure heading 412 provided is IDebugTask:: EnumSynchronizationObjects( ):

```
HRESULT EnumSynchronizationObjects([out]
    IEnumDebugSynchronizationObjects** ppEnum);
```

EnumSynchronizationObjects( ) gets the (possibly empty) set of synchronization objects 308 that the Task 128 is currently blocked waiting on, in parameter ppEnum, the enumerator for the synchronization objects. EnumSynchronizationObjects( ) returns S_OK on success, and if the set of synchronization objects is empty returns a valid enumerator for an empty set.

Another debug-individual-task procedure heading 412 provided is IDebugTask:: GetTaskProperties( ):

```
HRESULT GetTaskProperties(
    [in] TASKPROPERTY_FIELDS dwFields,
    [out] TASKPROPERTIES* pwp);
```

GetTaskProperties( ) gets properties 302 that describe this Task: the Tasks's id, state, location and name; see the TASKPROPERTIES struct below. Parameter dwFields is a set of flags that indicates which fields of pwp will be filled out, namely, a combination of the following flags: TCF_ID, TCF_STATE, TCF_NAME, TCF_CANCELED or TCF_LOCATION. Parameter pwp is the Task properties. Return value is S_OK if the function succeeded.

In one embodiment, the debug-task-provider interface 202 also includes "interface IDebugSynchronizationObject: IDebugRuntimeObject", written in C++. In this embodiment, an IDebugSynchronizationObject represents any object that can be used for Task synchronization. An example of a debug-synchronization procedure heading 414 is provided in the form of IDebugSynchronizationObject::GetOwningThread( ):

```
HRESULT GetOwningThread([out] IDebugThread2**
    ppThread);
```

GetOwningThread( ) gets the thread owner of the resource, in parameter ppThread, and returns S_OK if it succeeded in finding the owner and in returning a non-null value in ppThread. GetOwningThread( ) returns S_FALSE if the owner could not be discovered, or there is no current owner, and sets ppThread null. The owner is defined as being the one and only thread that is required to perform an action on this resource before any thread blocked on this resource can continue executing. An owner might not be defined for all types of synchronization objects, in which case S_FALSE is returned.

The TASKPROPERTIES struct is defined in this embodiment as follows:

```
struct TASKPROPERTIES
{
    TASKPROPERTY_FIELDS dwFields;
    DWORD dwTaskId;
    DWORD dwTaskState;
    BOOL fCanceled;
    BSTR bstrName;
    BSTR bstrLocation;
}
```

The struct TASKPROPERTIES is a data structure for describing information about a task 128, which may be implemented by a debugger extension for consumption by an integrated development environment. Field dwFields is a set of flags that indicates which of the remaining fields are valid, by a combination of the following: TWF_ID, TWF_STATE, TWF_NAME, TWF_CANCELED or TWF_LOCATION. Field dwTaskId is the runtime context identifier for this task. Field dwTaskState is the current state of this thread, namely, one of: TASKSTATE_UNKNOWN, TASKSTATE_INITIALIZED, TASKSTATE_RUNNING, TASKSTATE_WAITING, or TASKSTATE_COMPLETE. Field fCanceled is a flag indicating if this task has been canceled. Field bstrName is a user-displayable name of this task. Field bstrLocation is string that describes the location of this task. The location is usually the top-most stack frame, but may be something different if the top-most stack frame is not interesting from a debugging perspective.

In one embodiment IEnumDebugTasks, IEnumDebugTaskProviders, IEnumDebugSynchronizationObjects are standard enumerator interfaces for objects implementing IDebugTask, IDebugTaskProvider, and IDebugSynchronizationObject respectively.

Systems Continued

Figure 5:
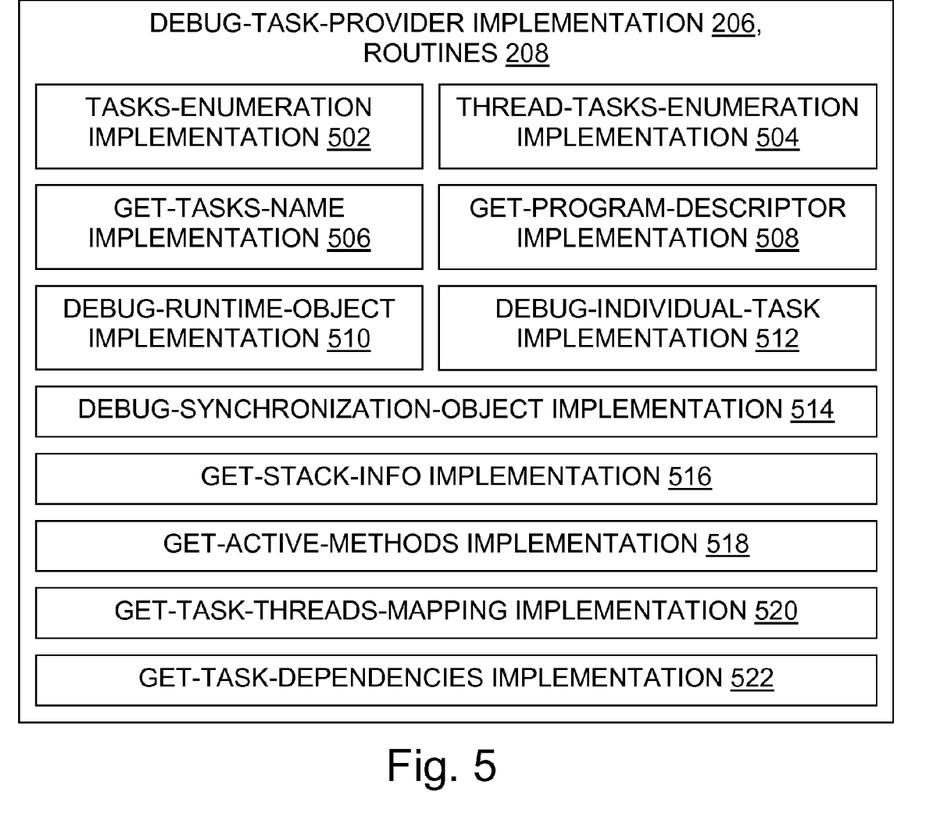
FIG. 5 is a block diagram further illustrating a debug-task-provider implementation.

With attention now to FIGS. 4 and 5, and the foregoing detailed example of a debug-task-provider interface 202, we consider additional aspects of some systems and other embodiments.

In particular, items in the interface 202 have at least one corresponding implementation, as shown for example in FIG. 5. Thus, a tasks-enumeration implementation 502 includes one or more routines which implement the tasks-enumeration procedure heading 402; a thread-tasks-enumeration implementation 504 includes one or more routines which implement the thread-tasks-enumeration procedure heading 404; a get-tasks-name implementation 506 includes one or more routines which implement the get-tasks-name procedure heading 406; a get-program-descriptor implementation 508 includes one or more routines which implement the get-program-descriptor procedure heading 408; a debug-runtime-object implementation 510 includes one or more routines which implement the debug-runtime-object procedure heading 410; a debug-individual-task implementation 512 includes one or more routines which implement the debug-individual-task procedure heading 412; a debug-synchronization-object implementation 514 includes one or more routines which implement the debug-synchronization-object procedure heading 414, and so on.

In some embodiments, the debug-task-provider implementation 206 implements enumeration of a task hierarchy 218 in the debuggee 126 program, the programming model 144 being specific in the debug-task-provider implementation but not in the interface 202. The hierarchy may be determined at least in part, for example, by an instance implementing IDebugTaskProvider.

In some embodiments, the debug-task-provider implementation 206 implements both reading and writing properties 314 of runtime objects 312 in the debuggee 126 program, again with the programming model being specific in the debug-task-provider implementation. Some suitable routines 208 may be provided, for example, by an instance implementing IDebugRuntimeObject. In some embodiments, routines 208 can read properties 314 but cannot write to them.

In some embodiments, the debug-task-provider implementation 206 implements both reading and writing properties 302 of an individual task 128 in the debuggee 126 program, again with the programming model being specific in the debug-task-provider implementation. Some suitable routines 208 may be provided, for example, by an instance implementing IDebugTask. In some embodiments, routines 208 can read properties 302 but cannot write to them.

In some embodiments, the debug-task-provider implementation 206 implements both reading and writing properties 310 of a task synchronization object 308 in the debuggee 126 program, again the programming model being specific in the debug-task-provider implementation. Some suitable routines 208 may be provided, for example, by an instance implementing IDebugSynchronizationObject. In some embodiments, routines 208 can read properties 310 but cannot write to them.

In some embodiments, the debug-task-provider implementation includes debugger routines 208 that are specific to a first programming model, and the system also includes in memory a second debug-task-provider implementation that includes debugger routines 208 that are specific to a second programming model. For example, a system may be configured for debugging one program that has tasks written in two different programming models 144.

In some embodiments, the debug-task-provider implementation 206 includes a routine 208 designed to return a stack base 318 and stack address range 320 for an individual task 128. The base and range may be useful, for example, to stitch together a call stack that crosses between two execution environments. Such routines provide an example of a get-stack-info implementation 516 and corresponding get-stack-info procedure heading 416. Another example is provided above by IDebugTask::EnumFrameInfo( ).

In some embodiments, the debug-task-provider implementation includes code such as a routine 208 designed to identify active methods 322 of the debuggee 126 program on their call stacks 132 in at least two execution environments. Such routines provide an example of a get-active-methods implementation 518 and corresponding get-active-methods procedure heading 418.

In some embodiments, the debug-task-provider implementation includes code such as a routine 208 designed to determine a mapping 306 between tasks and threads of the debuggee 126 program. Such routines provide an example of a get-task-threads-mapping implementation 520 and corresponding get-task-threads-mapping procedure heading 420. Another example is provided above by IDebugTask::GetThread( ).

In some embodiments, the debug-task-provider implementation includes code such as a routine 208 designed to identify resource dependencies of tasks of the debuggee 126 program, which may include wait chains, e.g., dependencies on synchronization objects 308 or on other objects or resources. Such routines provide an example of a get-task-dependencies implementation 522 and corresponding get-task-dependencies procedure heading 422. Another example is provided above by IDebugSynchronizationObject::GetOwningThread( ).

Figure 6:
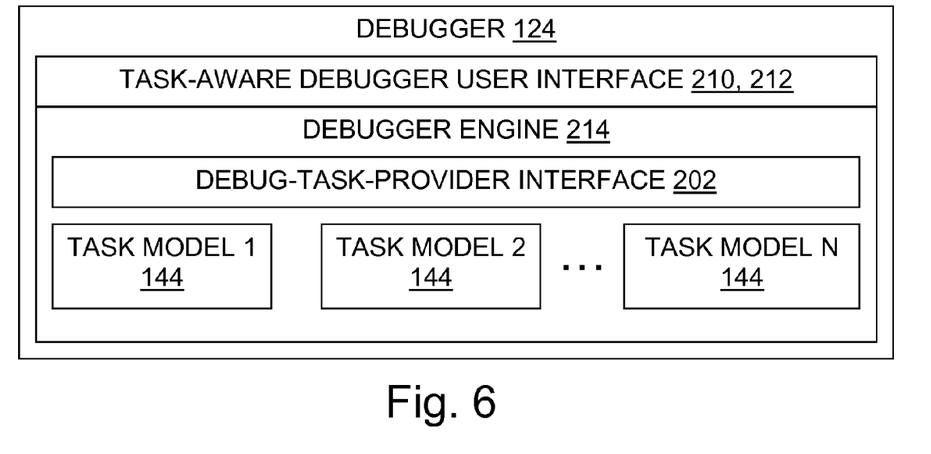
FIG. 6 is a block diagram further illustrating a debugger configured for debugging software written according to multiple models.

Turning now to FIG. 6, it will be appreciated that a particular debugger 124 that is configured for operations discussed herein can be roughly divided into a user interface 210 (possibly including a front-end 212) and an engine 214. The user interface interacts with the user 104 and makes requests and queries to the engine 214. The engine 214 interacts with and controls the debuggee 126 process. The interface 202 to task-model-specific routines 208 can be provided as an engine 214 extension that exposes query and control operations on debuggee tasks 128. A task debugging support extension is thus defined, in this configuration, as an additional interface on the debugger engine. The debugger engine 214 hosts a concrete implementation 206 of the interface(s) 202 for each task model 144 that is supported.

Figure 7:
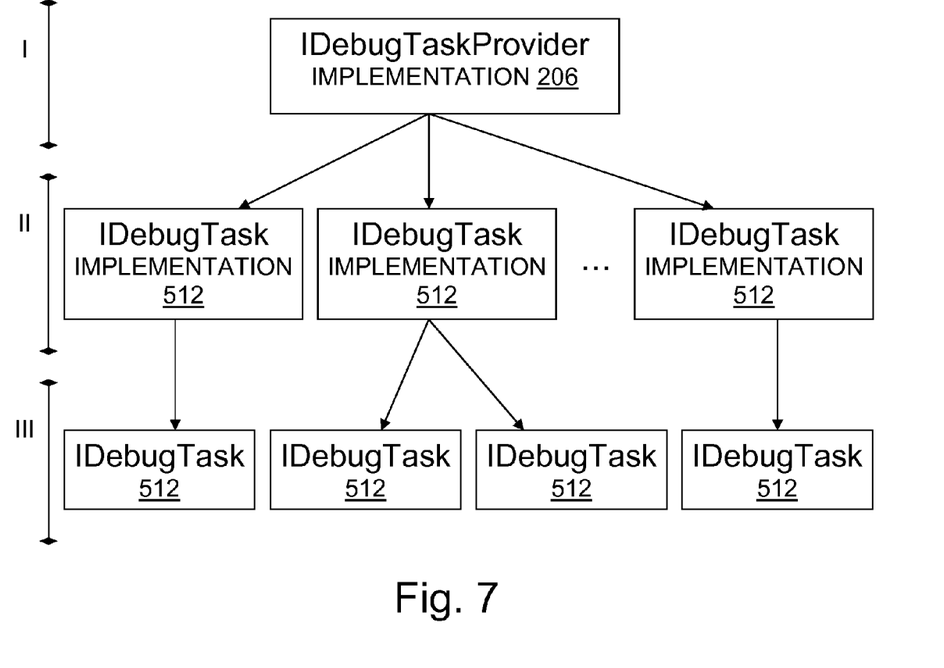
FIG. 7 is a block diagram illustrating a task hierarchy and corresponding items in a debug-task-provider implementation.

With reference to FIG. 7, the example implementation 206 discussed above may lead to a hierarchy of instances, within a debugger engine 214 (or an extension thereof) which corresponds to a debuggee task hierarchy 218. In this example, a task provider in the form of IDebugTaskProvider supports access to the debuggee 126 state information for tasks, namely, specified task information 216, as indicated at level I in FIG. 7. Root tasks 128 are indicated at level II by instances of IDebugTask implementations 512. A root task is a top-level task with no parent task; a given task may in general create any number of children, subject to resource constraints and limits imposed by the kernel 122. As indicated by level III in FIG. 7, tasks 128 may in general be nested arbitrarily deep in a creation hierarchy 218. The hierarchy tree shape reflects the debuggee's task creation structure.

Figure 8:
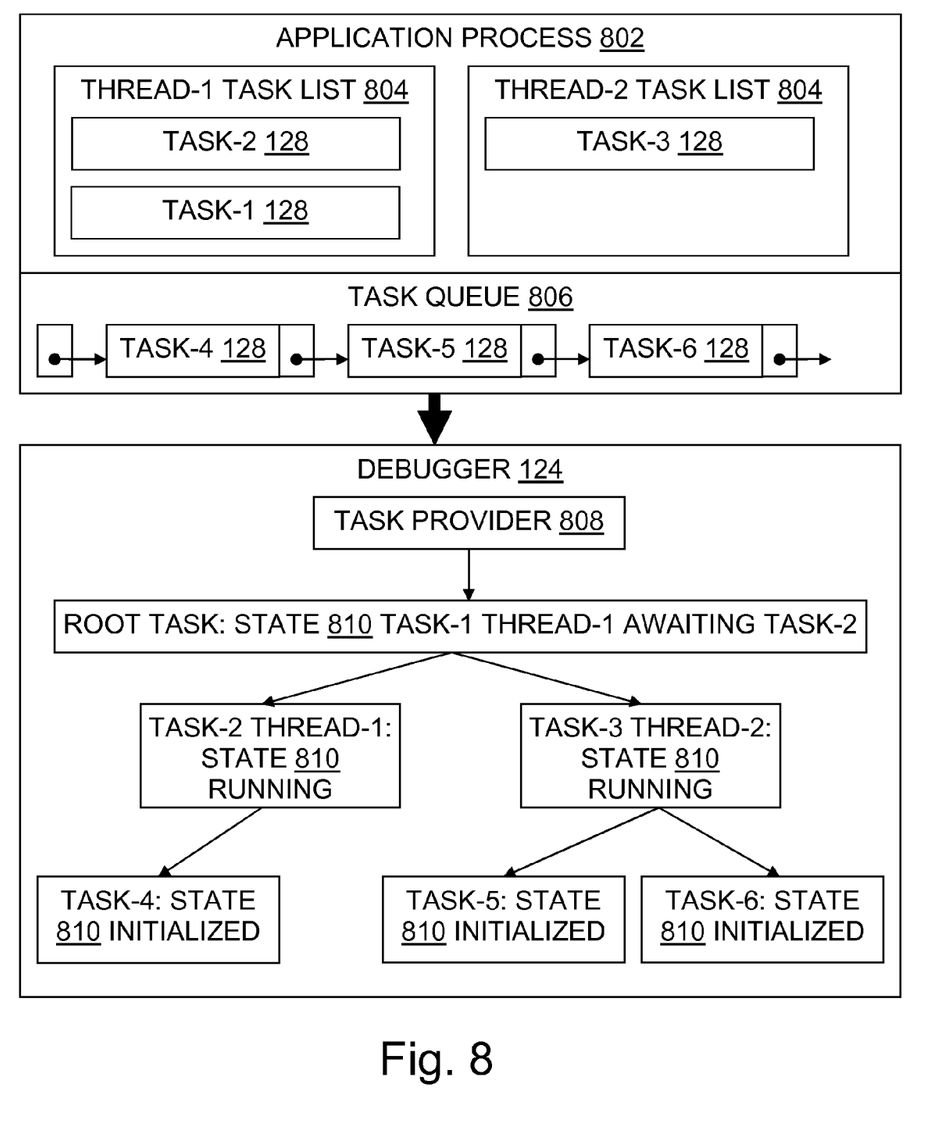
FIG. 8 is a block diagram illustrating a debuggee application process, a debugger, and corresponding sample task and thread information.

FIG. 8 illustrates a debuggee 126 in the form of an application process 802, which has two threads 130 currently executing, namely, thread-1 and thread-2. Each thread 130 has a task list 804 mapping threads to tasks and vice versa. Three tasks 128 are currently executing, namely, task-2 and task-1 on thread-1, and task-3 on thread-2. Thus, three tasks are assigned to the two executing threads. Three additional tasks (task-4, task-5, and task-6) are currently in a task queue 806 waiting to begin execution.

A debugger 124 is equipped with a task provider 808, such as a debug-task-provider interface 202 and an implementation 206, or in particular an IDebugTaskProvider. The task provider 808 maps debuggee 126 task state information 216 to a hierarchy 218 of debug-individual-task implementations 512, such as IDebugTask instances. Task-1 is a root task, and in this particular example, is the debuggee application's only root task, being the main task. The execution state 810 of the various tasks 128 and their threads 130 is shown. The hierarchy of IDebugTask instances reflects the debuggee's task creation hierarchy.

Methods Overview

Figure 9:
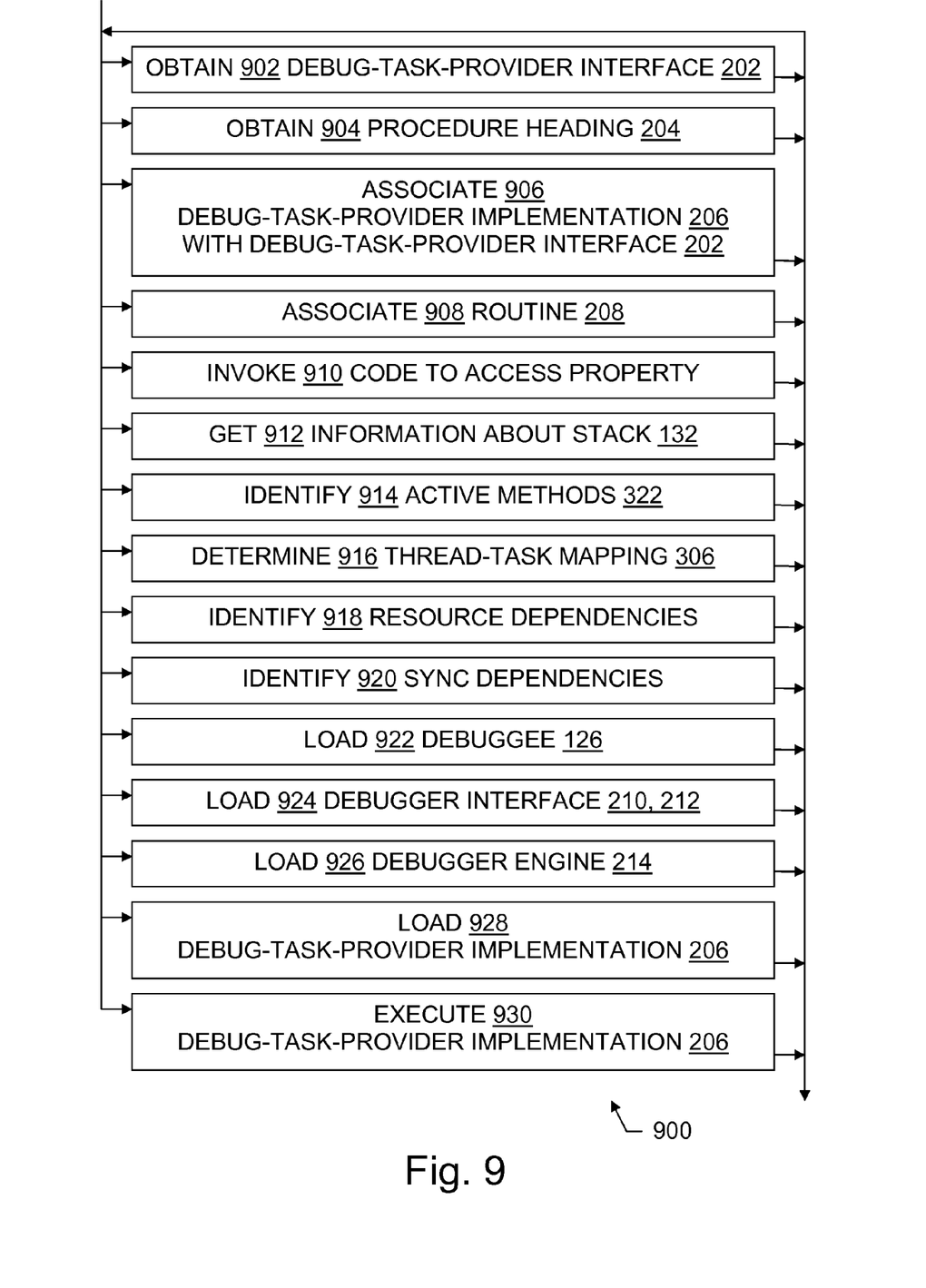
FIG. 9 is a flow chart illustrating steps of some method and configured storage medium embodiments.

FIG. 9 illustrates some method embodiments in a flowchart 900. In a given embodiment zero or more illustrated steps of a method may be repeated, perhaps with different parameters or data to operate on. Steps in an embodiment may also be done in a different order than the top-to-bottom order that is laid out in the Figure. Steps may be performed serially, in a partially overlapping manner, or fully in parallel. The order in which flowchart 900 is traversed to indicate the steps performed during a method may vary from one performance of the method to another performance of the method. The flowchart traversal order may also vary from one method embodiment to another method embodiment. Steps may also be omitted, combined, renamed, regrouped, or otherwise depart from the illustrated flow, provided that the method performed is operable and conforms to at least one claim.

During a debug-task-provider interface obtaining step 902, a software developer (or code acting on behalf of a developer) obtains a debug-task-provider interface 202. Obtaining step 902 may be accomplished by including a file containing code for the debug-task-provider interface 202, by linking such a file, by loading such a file, or by any mechanism for bringing software capabilities into an environment or into a particular program.

During a procedure heading obtaining step 904, a developer or an environment obtains a procedure heading 204. Procedure heading obtaining step 904 may coincide with interface obtaining step 902, but it will also be appreciated that by obtaining 902 a debug-task-provider interface 202 one may in some cases thereby obtain 904 several procedure headings 204.

During a debug-task-provider implementation associating step 906, a debug-task-provider implementation 206 is associated with a debug-task-provider interface 202. Associating step 906 may be accomplished by instantiating a class, by linking, by setting address pointers for routines, or by any other mechanism for associating 908 at least one routine 208 with a procedure heading 204 so that a call to the procedure heading passes control (and often also parameters) to the routine 208 which serves as the procedure's body.

During a routine associating step 908, a routine 208 is associated with a procedure heading 204. A given procedure heading 204 may be associated 908 with different routines 208 at different locations in a system. Routine associating step 908 may coincide with implementation associating step 906, but it will also be appreciated that by associating 906 a debug-task-provider implementation 206 one may in some cases thereby associate 908 several routines 208.

During a code invoking step 910, a routine 208 having a procedure heading 204 in a debug-task-provider interface 202 is invoked to access a property by reading (or in some embodiments by writing) the property. The accessed property may be a task property 302, a thread property 304, a synchronization object property 310, or a runtime object property 314, for example. Invoking step 910 may be accomplished using mechanisms that pass control to a routine, and may include passing parameters into the routine.

During a stack information getting step 912, a routine 208 having a procedure heading 204 in a debug-task-provider interface 202 is invoked to get information about a stack 132. Available information may include one or more stack frames 316, for example, or the stack's base 318 address and address range 320.

During an active methods identifying step 914, a routine 208 having a procedure heading 204 in a debug-task-provider interface 202 is invoked to get information about a task's active methods 322.

During a thread-task map determining step 916, a routine 208 having a procedure heading 204 in a debug-task-provider interface 202 is invoked to get a mapping 306 between threads 130 and tasks 128 in a debuggee 126.

During a resource dependency identifying step 918, a routine 208 having a procedure heading 204 in a debug-task-provider interface 202 is invoked to attempt to identify at least one resource 136 dependency of a task 128 in a debuggee 126.

During a sync dependency identifying step 920, a routine 208 having a procedure heading 204 in a debug-task-provider interface 202 is invoked to attempt to identify at least one synchronization dependency of a task 128 in a debuggee 126.

The GetOwningThread method of a synchronization object, for example, may be used to identify a dependency.

During a debuggee loading step 922, a debuggee 126 is loaded into memory if it is not already in memory 112, and is attached to a debugger 124 for debugging.

During a debugger interface loading step 924, a debugger user interface 210 (and optionally a debugger interface front-end 212) is loaded into memory if it is not already in memory 112, and is made available as part of a debugger 124 for debugging.

During a debugger engine loading step 926, a debugger engine 214 is loaded into memory if it is not already in memory 112, and is made available as part of a debugger 124 for debugging.

During a debug-task-provider implementation loading step 928, a debug-task-provider implementation 206 including at least one model-specific routine 208 is loaded into memory if it is not already in memory 112, and is attached to the debugger engine 214 and/or otherwise made available as part of a debugger 124 (from the user perspective) for debugging.

During a debug-task-provider implementation executing step 930, control is passed to at least one model-specific routine 208 of a debug-task-provider implementation 206.

Some embodiments provide a method which may be used by a developer to help debug a debuggee 126 program which contains tasks 128 that are implemented in a particular programming model 144. The method includes obtaining 902 a debug-task-provider interface 202, namely, obtaining 904 at least one procedure heading 204 for invoking a routine to enumerate tasks of the debuggee program which are implemented in the programming model. The programming model is unspecified in the debug-task-provider interface 202. The method also includes associating 906 a debug-task-provider implementation 206 with the debug-task-provider interface, namely, associating 908 at least one routine 208 which implements enumeration of tasks of the debuggee program that are implemented in the programming model. The programming model 144 is reflected by specific constructs, variables, calls, or other model-specific code in the debug-task-provider implementation 206. Because the programming model is unspecified in the debug-task-provider interface 202, the interface 202 can be implemented by different instances for different programming models 144.

In some embodiments, the obtaining step 902 obtains a debug-task-provider interface 202 containing at least two of the following procedure headings: a root-task-enumeration procedure heading 402 such as IDebugTaskProvider.EnumTasks( ) for invoking a procedure to enumerate at least one root task of the debuggee program implemented in the programming model 144; a thread-tasks-enumeration procedure heading 404 such as IDebugTaskProvider.EnumThreadTasks( ) for invoking a procedure to enumerate tasks 128 of the debuggee program implemented in the programming model 144 and associated with a particular thread 130; a get-tasks-name procedure heading 406 such as IDebugTaskProvider.GetName( ) for invoking a procedure to obtain a string containing a term used to refer collectively to tasks 128 of the debuggee program implemented in the programming model 144; a get-program-descriptor procedure heading 408 such as IDebugTaskProvider.GetProgram( ) for invoking a procedure to obtain a descriptor identifying the debuggee 126 program.

In some embodiments, the method further includes invoking 910 code to access a property of an individual task of the debuggee program while debugging the debuggee program, such as by calling one of IDebugTask's methods. In some, the method includes invoking 910 code to access a property 310 of a task synchronization object 308 of the debuggee program while debugging the debuggee program in a multi-threaded environment, such as by calling one of IDebugSynchronizationObject's methods.

In some embodiments, the associating step 906 associates a first debug-task-provider implementation with the debug-task-provider interface, namely, associates 908 at least a first routine which implements enumeration of tasks of the debuggee program that are implemented in a first programming model that is specific in the first debug-task-provider implementation, and the method further includes associating 906 a second debug-task-provider implementation with the debug-task-provider interface, namely, associating 908 at least a second routine which implements enumeration of tasks of the debuggee program that are implemented in a second programming model 144 which is specific in the second debug-task-provider implementation. Thus, some methods support debugging a program that has some tasks written in a first programming model and other tasks written in a second programming model, e.g., by using two different instances of IDebugTaskProvider.

Configured Media

Some embodiments include a configured computer-readable storage medium 114, which is an example of a memory 112. Memory 112 may include disks (magnetic, optical, or otherwise), RAM, EEPROMS or other ROMs, and/or other configurable memory. The storage medium which is configured may be in particular a removable storage medium 114 such as a CD, DVD, or flash memory. A general-purpose memory 112, which may be removable or not, and may be volatile or not, can be configured into an embodiment using components such as a debug-task-provider interface 202 and implementation 206, in the form of corresponding data 118 and instructions 116, read from a removable medium 114 and/or another source such as a network connection, to thereby form a configured medium in the form of configured memory 112 which is capable of causing a computer system to perform method steps for configuring software and/or for providing support for debugging tasks written according to one or more programming models, or providing other debugging capabilities, as disclosed herein. FIGS. 1 through 8 thus help illustrate configured storage media embodiments and method embodiments, as well as system embodiments.

Some embodiments provide a storage medium 114 configured with computer data 118 and computer instructions 116 for debugging a debuggee 126 program which contains tasks 128 that are implemented in a particular programming model 144. The method includes loading 922 a debuggee program into a memory 112 of a computer system 102, the memory being in operable communication with at least one logical processor 110. The method also includes loading 924 a debugger user interface 210 and a debugger engine 214 which is in operable communication with the debugger user interface and with the debuggee program. The programming model 144 is unspecified in the debugger engine. The method also includes loading 928 a debug-task-provider implementation 206 which is in operable communication with the debugger engine and which includes debugger viewing routines 208 that are specific to the programming model 144 and are designed for reading at least some task information 216 of the debuggee program.

In some embodiments, the method further includes executing 930 debug-task-provider implementation 206 code to enumerate a task creation hierarchy 218 of tasks 128 of the debuggee 126 program. In some, the method includes executing 930 debug-task-provider implementation 206 code to identify a thread which owns a task synchronization object of the debuggee program, e.g., IDebugSynchronizationObject.GetOwningThread( ). In some, the method includes executing 930 debug-task-provider implementation 206 code to enumerate a runtime-specific set of task properties 302 of a task 128 of the debuggee program, e.g., IDebugRuntimeObject.EnumProperties( ).

More generally, any of the method steps illustrated in FIG. 9, or otherwise taught herein, may be used to help configure a storage medium to thereby form a configured medium embodiment.

Conclusion

As described herein, some embodiments provide various tools and techniques to provide direct debugger support for tasks, particularly for tasks written in a specific programming model. A task provider 808 describes interaction with tasks, and querying of tasks, for a debugger.

Although particular embodiments are expressly illustrated and described herein as methods, configured media, or systems, it will be appreciated that discussion of one type of embodiment also generally extends to other embodiment types. For instance, the descriptions of methods in connection with FIG. 9 also help describe configured media, as well as the operation of systems like those described in connection with FIGS. 1 through 8. It does not follow that limitations from one embodiment are necessarily read into another. In particular, methods are not necessarily limited to the data structures and arrangements presented while discussing systems.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or methodological acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

What is claimed is:

1. A method used by a developer to help debug a debuggee program which contains tasks that are implemented in a particular programming model, the method comprising the steps of:

obtaining a debug-task-provider interface by execution of processor instructions, namely, obtaining in an operating environment memory at least one procedure heading for invoking a procedure to enumerate tasks of the debuggee program which are implemented in the programming model, the programming model being unspecified in the debug-task-provider interface; and associating a debug-task-provider implementation with the debug-task-provider interface by execution of processor instructions, namely, associating with the debug-task-provider interface, in the operating environment memory, at least one routine which implements enumeration of tasks of the debuggee program that are implemented in the programming model, the programming model being specific in the debug-task-provider implementation.

2. The method of claim 1, wherein the obtaining step obtains a debug-task-provider interface containing at least two of the following procedure headings:
- a root-task-enumeration procedure heading for invoking a procedure to enumerate at least one root task of the debuggee program implemented in the programming model;
- a thread-tasks-enumeration procedure heading for invoking a procedure to enumerate tasks of the debuggee program implemented in the programming model and associated with a particular thread;
- a get-tasks-name procedure heading for invoking a procedure to obtain a string containing a term used to refer collectively to tasks of the debuggee program implemented in the programming model;
- a get-program-descriptor procedure heading for invoking a procedure to obtain a descriptor identifying the debuggee program.

3. The method of claim 1, further comprising invoking code to access a property of an individual task of the debuggee program while debugging the debuggee program.

4. The method of claim 1, further comprising invoking code to access a property of a task synchronization object of the debuggee program while debugging the debuggee program in a multi-threaded environment.

5. The method of claim 1, wherein the associating step associates a first debug-task-provider implementation with the debug-task-provider interface, namely, associates at least a first routine which implements enumeration of tasks of the debuggee program that are implemented in a first programming model that is specific in the first debug-task-provider implementation, and the method further comprises associating a second debug-task-provider implementation with the debug-task-provider interface, namely, associating at least a second routine which implements enumeration of tasks of the debuggee program that are implemented in a second programming model, the second programming model being specific in the second debug-task-provider implementation.

6. A computer system configured to assist debugging of a debuggee program which contains tasks that are implemented in a particular programming model, the system comprising:
- a memory;
- a logical processor in operable communication with the memory;
- a debuggee program configuring the memory;
- a debugger user interface configuring the memory;
- a debugger engine which is in operable communication with the debugger user interface and with the debuggee program, the programming model being unspecified in the debugger engine; and
- a debug-task-provider implementation which is in operable communication with the debugger engine and which includes debugger viewing and manipulation routines that are specific to the programming model and designed for reading and writing at least some task information of the debuggee program.

7. The system of claim 6, wherein the debug-task-provider implementation implements enumeration of a task hierarchy in the debuggee program, the programming model being specific in the debug-task-provider implementation.

8. The system of claim 6, wherein the debug-task-provider implementation implements reading and writing properties of runtime objects in the debuggee program, the programming model being specific in the debug-task-provider implementation.

9. The system of claim 6, wherein the debug-task-provider implementation implements reading and writing properties of an individual task in the debuggee program, the programming model being specific in the debug-task-provider implementation.

10. The system of claim 6, wherein the debug-task-provider implementation implements reading and writing properties of a task synchronization object in the debuggee program, the programming model being specific in the debug-task-provider implementation.

11. The system of claim 6, wherein the debug-task-provider implementation includes debugger viewing and manipulation routines that are specific to a first programming model, and the system further comprises in memory a second debug-task-provider implementation that includes debugger viewing and manipulation routines that are specific to a second programming model.

12. The system of claim 6, wherein the debug-task-provider implementation includes a routine designed to return a stack base and address range for an individual task.

13. The system of claim 6, wherein the debug-task-provider implementation includes code designed to identify active methods of the debuggee program on their call stacks in at least two execution environments.

14. The system of claim 6, wherein the debug-task-provider implementation includes code designed to determine a mapping between tasks and threads for the debuggee program.

15. The system of claim 6, wherein the debug-task-provider implementation includes code designed to identify resource dependencies of tasks of the debuggee program.

16. The system of claim 6, wherein the debug-task-provider implementation includes code designed to identify synchronization dependencies of tasks of the debuggee program, and wherein the debuggee program is multi-threaded.

17. A storage medium configured with computer data and computer instructions for debugging a debuggee program which contains tasks that are implemented in a particular programming model, the method comprising the steps of:
- loading a debuggee program into a memory of a computer system, the memory being in operable communication with at least one logical processor;
- loading a debugger user interface and a debugger engine which is in operable communication with the debugger user interface and with the debuggee program, the programming model being unspecified in the debugger engine; and
- loading a debug-task-provider implementation which is in operable communication with the debugger engine and which includes debugger viewing routines that are specific to the programming model and designed for reading at least some task information of the debuggee program.

18. The configured medium of claim 17, wherein the method further comprises executing debug-task-provider implementation code to enumerate a task creation hierarchy of tasks of the debuggee program.

19. The configured medium of claim 17, wherein the method further comprises executing debug-task-provider implementation code to identify a thread which owns a task synchronization object of the debuggee program.

20. The configured medium of claim 17, wherein the method further comprises executing debug-task-provider implementation code to enumerate a runtime-specific set of task properties of a task of the debuggee program.

* * * * *